(12) United States Patent
Li et al.

(10) Patent No.: US 8,825,864 B2
(45) Date of Patent: Sep. 2, 2014

(54) SYSTEM AND METHOD FOR SUPPORTING A DYNAMIC RESOURCE BROKER IN A TRANSACTIONAL MIDDLEWARE MACHINE ENVIRONMENT

(75) Inventors: Zhenyu Li, Beijing (CN); Lidan Liu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 13/423,024

(22) Filed: Mar. 16, 2012

(65) Prior Publication Data
US 2013/0086271 A1  Apr. 4, 2013

Related U.S. Application Data

(60) Provisional application No. 61/541,059, filed on Sep. 29, 2011.

(51) Int. Cl.
*G06F 15/173* (2006.01)
*G06F 15/16* (2006.01)

(52) U.S. Cl.
USPC .......................................... 709/226; 709/229

(58) Field of Classification Search
None
See application file for complete search history.

(56) References Cited

U.S. PATENT DOCUMENTS

| | | | |
|---|---|---|---|
| 5,995,945 A | 11/1999 | Notani et al. | |
| 6,075,938 A * | 6/2000 | Bugnion et al. | 703/27 |
| 6,640,238 B1 | 10/2003 | Bowman-Amuah | |
| 7,376,945 B1 | 5/2008 | Kakumani et al. | |
| 7,458,073 B1 | 11/2008 | Darling et al. | |
| 7,506,335 B1 | 3/2009 | Wooff et al. | |
| 7,657,887 B2 | 2/2010 | Kothandaraman et al. | |
| 8,196,133 B2 | 6/2012 | Kakumani et al. | |
| 8,443,438 B1 * | 5/2013 | Sharir et al. | 726/22 |
| 8,527,545 B2 | 9/2013 | Bobick et al. | |
| 8,572,612 B2 * | 10/2013 | Kern | 718/1 |
| 8,615,761 B2 * | 12/2013 | Machida | 718/100 |
| 2003/0050932 A1 | 3/2003 | Pace et al. | |
| 2003/0131084 A1 * | 7/2003 | Pizzorni et al. | 709/223 |

(Continued)

OTHER PUBLICATIONS

Rayns et al. TXSeries for Multiplatforms Version 6 Revealed, 2006, IBM Redbooks Paper, pp. 1-42.*

(Continued)

*Primary Examiner* — Farid Homayounmehr
*Assistant Examiner* — Olanrewaju Bucknor
(74) *Attorney, Agent, or Firm* — Meyer IP Law Group (57) ABSTRACT

A system and method can support dynamically scaling up/down transactional resources in a transactional middleware machine environment. Transactional resources, such as groups and machines, can be by added or removed using a dynamic resource broker according to resource usage changes. The transactional middleware machine environment can comprise a deployment center in the transactional middleware machine environment, wherein the deployment center maintains one or more deployment policies for the transactional middleware machine environment and one or more deployment agents. Each of the one or more deployment agents is associated with a transactional middleware machine of a plurality of transactional middleware machines in a transactional domain in the transactional middleware machine environment. The deployment center operates to receive machine usage information from the one or more deployment agents, and dynamically scale up/down resources used in the transactional domain based on the resource usage information collected by the one or more deployment agents.

18 Claims, 4 Drawing Sheets

(56) References Cited

U.S. PATENT DOCUMENTS

| | | | |
|---|---|---|---|
| 2003/0167270 A1* | 9/2003 | Werme et al. | 707/10 |
| 2008/0082689 A1* | 4/2008 | Saad | 709/246 |
| 2008/0256531 A1 | 10/2008 | Gao et al. | |
| 2008/0275935 A1* | 11/2008 | Mohindra et al. | 709/201 |
| 2011/0137935 A1 | 6/2011 | Bobick et al. | |
| 2011/0137953 A1 | 6/2011 | Bobick et al. | |
| 2011/0179134 A1* | 7/2011 | Mayo et al. | 709/214 |
| 2011/0213884 A1* | 9/2011 | Ferris et al. | 709/226 |

OTHER PUBLICATIONS

International Search Report and Written Opinion dated Nov. 29, 2012, International Application No. PCT/US2012/057131, 7 pages.

International Search Report and Written Opinion dated Nov. 29, 2012, International Application No. PCT/US2012/057136, 8 pages.

* cited by examiner

SYSTEM AND METHOD FOR SUPPORTING A DYNAMIC RESOURCE BROKER IN A TRANSACTIONAL MIDDLEWARE MACHINE ENVIRONMENT

CLAIM OF PRIORITY

This application claims the benefit of priority on U.S. Provisional Patent Application No. 61/541,059, entitled "SYSTEM AND METHOD FOR SUPPORTING A DYNAMIC RESOURCE BROKER IN A TRANSACTIONAL MIDDLEWARE MACHINE ENVIRONMENT" filed Sep. 29, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent application Ser. No. 13/423,035, entitled "SYSTEM AND METHOD SUPPORTING AUTOMATICALLY DEPLOYING/UNDEPLOYING APPLICATION COMPONENTS IN A MIDDLEWARE MACHINE ENVIRONMENT," filed Mar. 16, 2012.

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein is a system and method for supporting dynamically scaling up/down transactional resources in a transactional middleware machine environment. Transactional resources, such as groups and machines, can be added or removed using a dynamic resource broker according to resource usage changes. The transactional middleware machine environment can comprise a deployment center in the transactional middleware machine environment, wherein the deployment center maintains one or more deployment policies for the transactional middleware machine environment and one or more deployment agents. Each of the one or more deployment agents is associated with a transactional middleware machine of a plurality of transactional middleware machines in a transactional domain in the transactional middleware machine environment. The deployment center operates to receive machine usage information from the one or more deployment agents, and dynamically scale up/down resources used in the transactional domain based on the resource usage information collected by the one or more deployment agents.

DETAILED DESCRIPTION

Described herein is a system and method for supporting a transactional middleware system that can take advantage of fast machines with multiple processors, and a high performance network connection. A dynamic resource broker can dynamically scale up/down a transactional system in the transactional middleware machine environment by adding/removing groups and machines according to the resource usage changes. The transactional middleware machine environment can comprise a deployment center in the transactional middleware machine environment, wherein the deployment center maintains one or more deployment policies for the transactional middleware machine environment, and one or more deployment agents, each of which is associate with a transactional middleware machine of a plurality of transactional middleware machines in a transactional domain in the transactional middleware machine environment. The deployment center operates to receive machine usage information from the one or more deployment agents, and dynamically scale up/down resource used in the transactional domain based on the resource usage information collected by the one or more deployment agents.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a transactional system, e.g. Tuxedo, can be a set of software modules that enables the construction, execution, and administration of high performance, distributed business applications and has been used as transactional middleware by a number of multi-tier application development tools. The transactional system is a platform that can be used to manage distributed transaction processing in distributed computing environments. It is a platform for unlocking enterprise legacy applications and extending them to a services oriented architecture, while delivering unlimited scalability and standards-based interoperability.

A dynamic resource broker can dynamically scale up/down the transactional system, e.g. a Tuxedo, in the transactional middleware machine environment by adding/removing groups and machines according to the resource usage changes. Thus, the transactional system can take advantage of fast machines with multiple processors, e.g. Exalogic middleware machines, and a high performance network connection, e.g. an Infiniband (IB) network.

Scaling Up and Down a Transactional System

In accordance with an embodiment of the invention, a dynamic resource broker can be supported in a transactional middleware machine environment to dynamically scale up/down a transactional system according to the resource usage changes. The dynamic resource allocation/de-allocation of a transactional system can help the users to manage the resources in a flexible cloud environment. The system can collect resource usage metrics, and the users are allowed to define rules to scale up/down transactional resources based on resource usage changes. Then, the transactional system can be dynamically scaled up and down according to the user-defined rules based on the resource usage changes.

Figure 1:
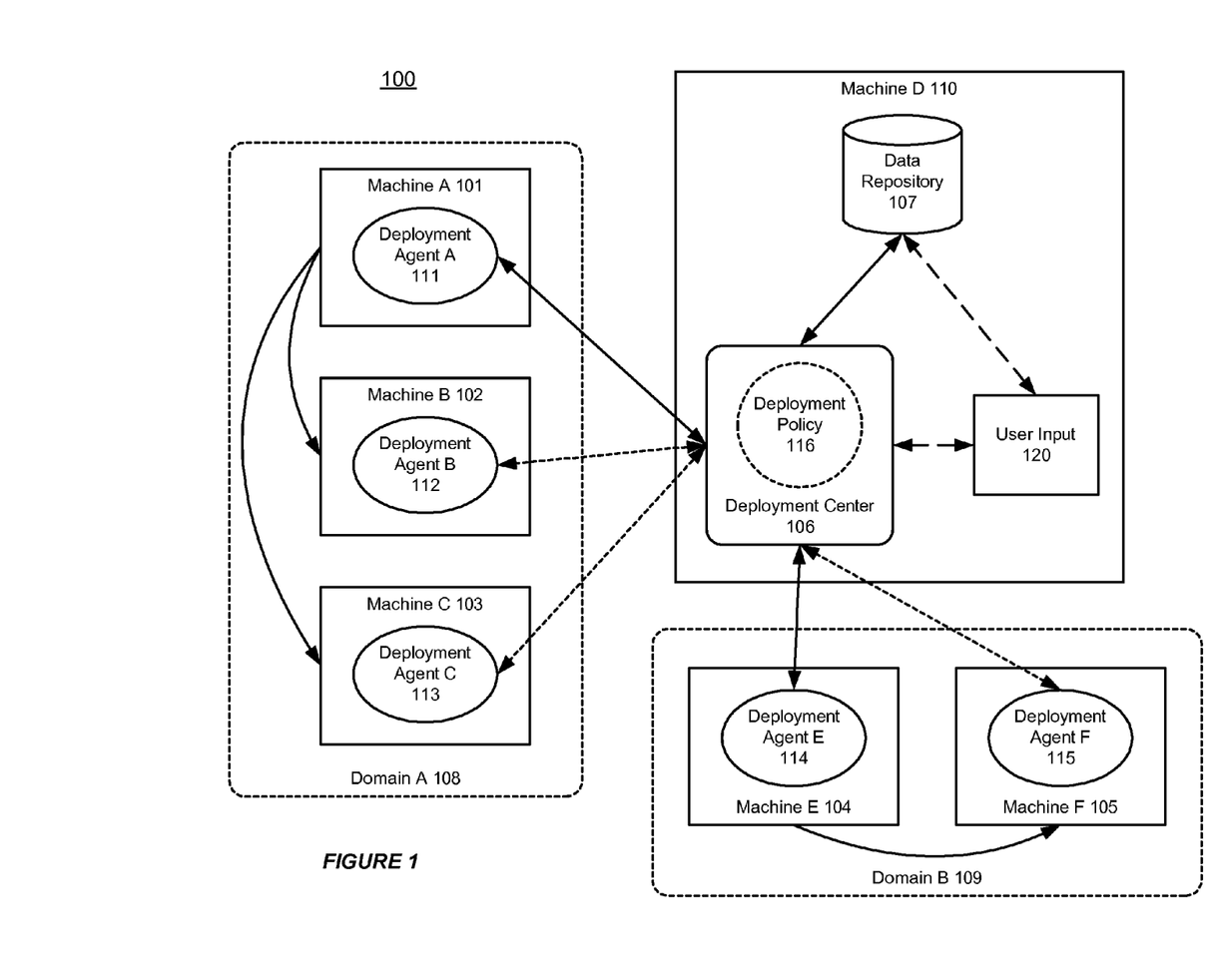
FIG. 1 shows an illustration of a transactional middleware machine environment that supports dynamically scaling up/down a transactional system in a transactional middleware machine environment, in accordance with an embodiment of the invention.

FIG. 1 shows an illustration of a transactional middleware machine environment that supports dynamically scaling up/down a transactional system in a transactional middleware machine environment, in accordance with an embodiment of the invention. As shown in FIG. 1, the transactional middleware machine environment 100 includes a plurality of transactional middleware machines, such as Machines A-D 101-103 and 110.

A dynamic resource broker in a transactional middleware machine environment can include several components, such as a data repository 107 on Machine D 110, a deployment center 106 on Machine D 110, and one or more deployment agents: Deployment Agents A-C 111-113. Each deployment agent resides on a transactional middleware machine, Machines A-C 101-103, in the transactional middleware machine environment.

A deployment center 106 can receive all the user inputs 120 and is responsible for distributing the instructions/packages to the destination machines, Machines A-C 101-103, and receiving the execution result from the destination machines. Additionally, the deployment center 106 can maintain one or more deployment policies 116 for the transactional middleware machine environment based on user input 120.

Each deployment agent, Deployment Agents A-C 111-113, is responsible for receiving the distribution packages from the deployment center 106, and executing the deployment/undeployment/management tasks on a particular machine that it resides on. Furthermore, each deployment agent, Deployment Agents A-C 111-113, can collect resource usage metrics of a particular machine that the deployment agent resides on and report such resource usage metrics back to the deployment center 106. Then, at runtime, the deployment center 106 can make decisions on how to add or remove groups and machines according to the resource usage changes. Finally, the deployment agent, Deployment Agents A-C 111-113, can provide the execution result back to the deployment center 106.

As shown in FIG. 1, the transactional middleware machine environment 100 can include one or more transactional domains, such as Domains A-B 108-109. In addition to Machines A-C 101-103 in Domain A 108, the deployment center 106 on Machine D 110 can receive machine usage information for Machines E-F 104-105 in Domain B 109 via Deployment Agents E-F 104-105. The deployment center 106 can manage the resource usage seperately for each transactional domain, Domain A-B 108-109. The deployment center 106 operates to dynamically scale up and/or down work load in each transactional domain, Domain A-B 108-109, based on the resource usage information collected by the deployment agents, Deployment Agents A-C 111-113 in Domain A 108 and Deployment Agents E-F 114-115 in Domain B 109.

Within each transactional domain, Domains A-B 108-109, there can be a master machine that can always be available for providing transactional services. In the example as shown in FIG. 1, Machine A 101 can be the master machine in Domain A 108. Therefore, the configuration of Machine A 101 may not be changed, while the deployment center 106 can dynamically decide whether Machine B 102 and Machine C 103 should be activated and be deployed with necessary components at run time.

The data repository 107 can be used to store the application deployment related information, such as application packages, distribution packages and configuration files. Users can upload all necessary components for an application into the data repository 107, before the application is deployed to various transactional application server machines. The deployment center 106 can obtain the required components for a deployment from the data repository 107 and deploy the particular components to a particular machine in order to meet the service needs.

Figure 2:
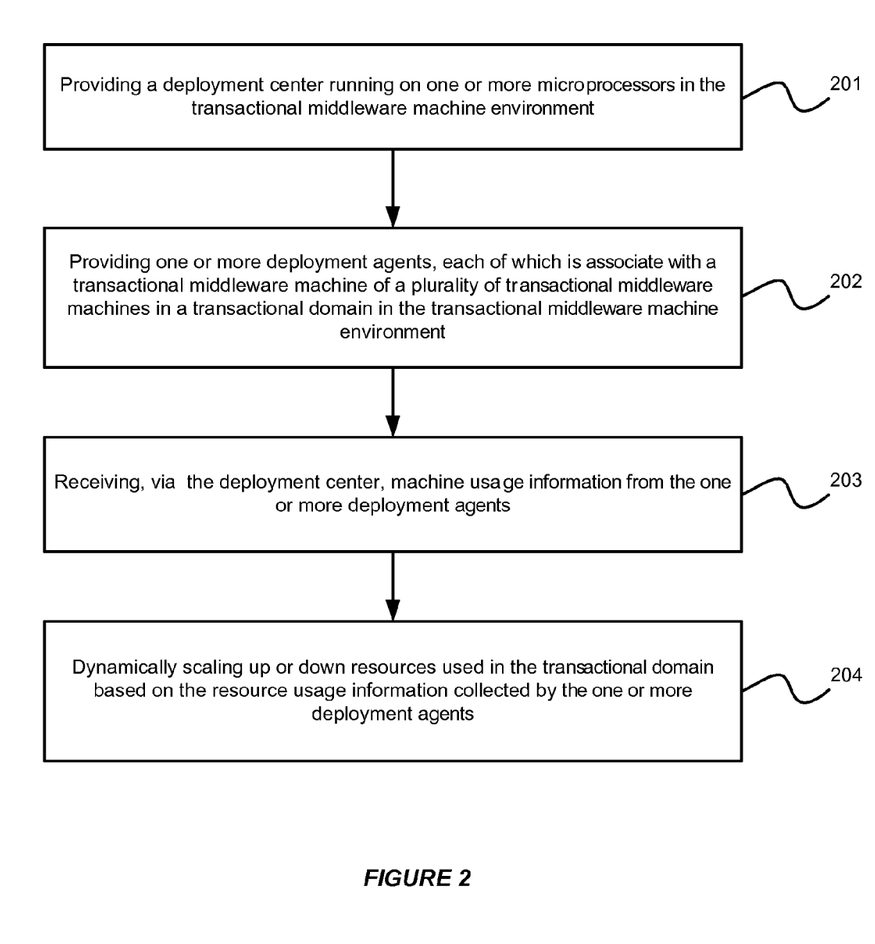
FIG. 2 illustrates an exemplary flow chart for supporting dynamically scaling up/down a transactional system in a transactional middleware machine environment, in accordance with an embodiment of the invention.

FIG. 2 illustrates an exemplary flow chart for supporting dynamically scaling up/down a transactional system in a transactional middleware machine environment, in accordance with an embodiment of the invention. As shown in FIG. 2, at step 201, a deployment center is provided in the transactional middleware machine environment. At step 202, one or more deployment agents are provided in the transactional middleware machine environment. Each deployment agent is associated with a transactional middleware machine in a transactional domain in the transactional middleware machine environment. Then, at step 203, the deployment center receives machine usage information from the one or more deployment agents. Finally, at step 204, the system can dynamically scaling up/down resources used in the transactional domain based on the resource usage information collected by the one or more deployment agents.

As disclosed bellow, the transactional system can be dynamically scaled up/down at two levels: machine level and package level.

Package Level Dynamic Deployment

In accordance with an embodiment of the invention, a dynamic resource broker can dynamically scale up/down a transactional system according to the resource usage changes at the package level.

Figure 3:
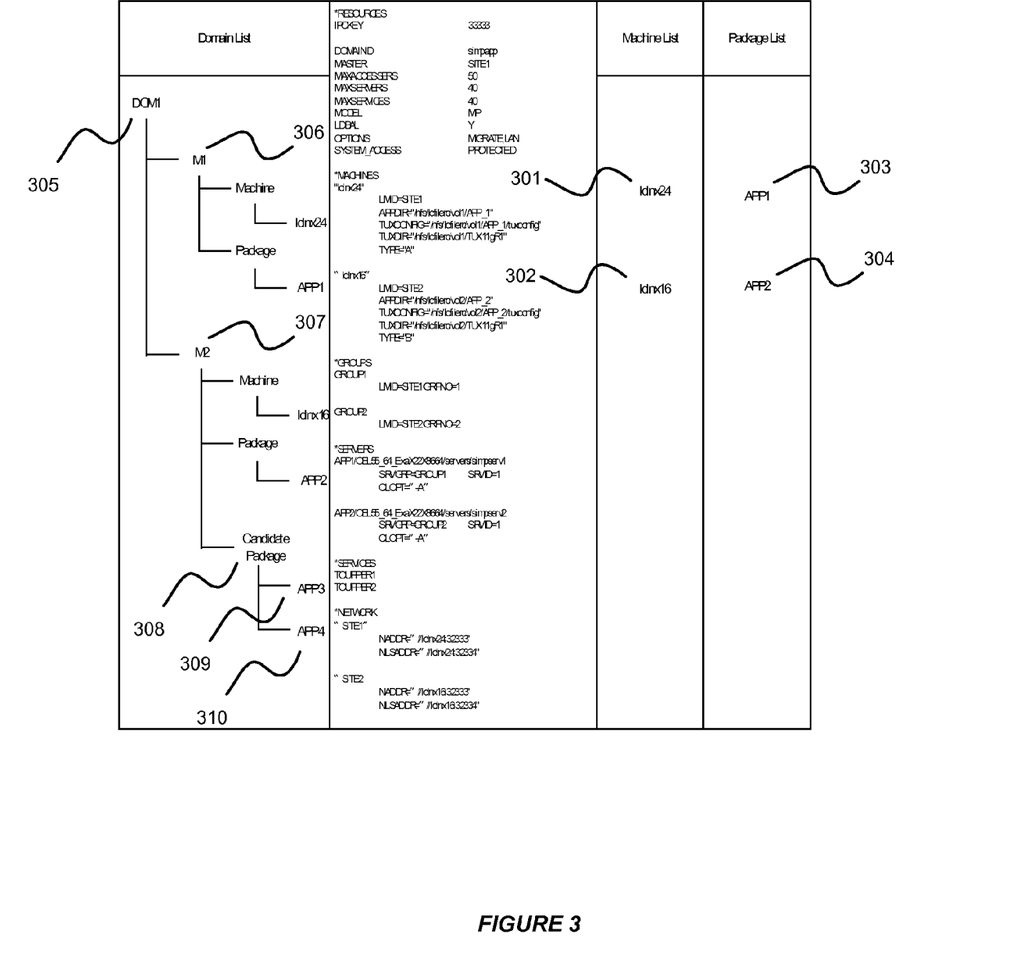
FIG. 3 shows an illustration of dynamically scaling up/down resources at the package level in a transactional middleware environment, in accordance with an embodiment of the invention.

FIG. 3 shows an illustration of dynamically scaling up/down a transactional system at a package level in a transactional middleware environment. As shown in FIG. 3, the transactional middleware environment includes two physical or logical machines, lclnx24 301 and lclnx16 302, which are responsible for running two applications: APP1 303 and APP2 304.

Additionally, the transactional middleware environment includes a domain, DOM1 305, which includes two virtual machines, M1 306 and M2 307. The virtual machine M1 306 is bound to the physical or logical machine, lclnx24 301, and is responsible for running application package APP1 303. Similarly, the virtual machine M2 307 is bound to the physical or logical machine, lclnx16 302, and is responsible for running application package APP2 304.

As shown in FIG. 3, under the virtual machine M2 307, there's a package candidate directory, Candidate Package 308, where a user can add additional packages, APP3 309 and APP4 310, to the virtual machine M2 307.

Users can add application packages for dynamic deployment to a virtual machine, e.g. M2 307, regardless of the status of the domain. For example, users can add application packages to the virtual machine M2 307, when the domain, DOM 1 305, is in an edit, deployment, booting or shutdown status. In such a case, the deployment information of the dynamically added application packages, APP3 309 and APP4 310, may not be written into the existing transactional server configuration file, such as a Tuxedo UBBCONFIG file. On the other hand, the system may only allow the package level dynamic scaling up/down of the domain, DOM 1 305, when it is in a running status.

As disclosed below, the system allows a user to perform the package level dynamic deployment both manually and automatically.

A manual way to perform the package level dynamic deployment allows a user to manually activate the application packages one by one when user determined conditions are satisfied, e.g. when the virtual machine M2 307 is underloaded. In the example of FIG. 3, a user can choose to activate APP3 309. Then, the system can select the related application package files stored in the data repository, and perform a series of application management operations, such as Tuxedo Management Information Base (MIB) operations, in order to deploy the application package, APP3 309, to the physical or logical machine, lclnx16 302, and boot the servers contained in this machine. Additionally, after the application package APP3 309 is activated, users can choose to de-activate it. Then, the system can shut down all its servers and undeploy the application package APP3 309 from the physical or logical machine, lclnx16 302.

On the other hand, an automatic way to perform the package level dynamic deployment allows the system to perform the MIB operations as described above automatically, with the user determined conditions pre-defined. Furthermore, the system can automatically undeploy the application package when necessary.

Additionally, in the example of Tuxedo, the same parameter replacement rules can be used to perform the above MIB operations in both the manual deployment and the automatic deployment. Additionally, the dynamic resource broker can reuse existing mechanisms, e.g. file formats, for deploying application packages to perform the dynamic scaling up/down of resources in a transactional domain.

Machine Level Dynamic Deployment

In accordance with an embodiment of the invention, a dynamic resource broker can dynamically scale up/down a transactional system according to the resource usage changes at the machine level.

Figure 4:
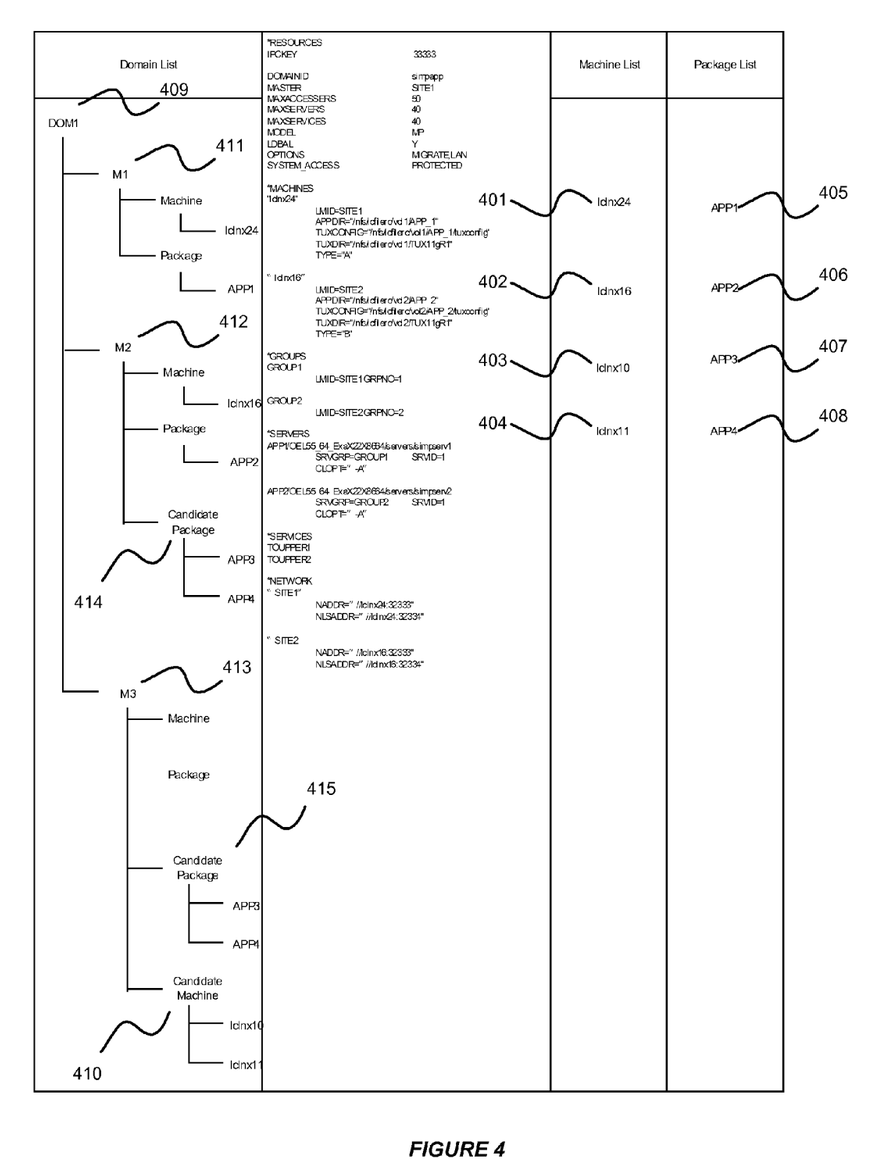
FIG. 4 shows an illustration of dynamically scaling up/down resources at the machine level in a transactional middleware environment, in accordance with an embodiment of the invention.

FIG. 4 shows an illustration of dynamically scaling up/down a transactional system at a machine level in a transactional middleware environment. As shown in FIG. 4, the transactional middleware environment includes four physical or logical machines, lclnx24 401, lclnx16 402, lclnx10 403 and lclnx11 404, which are responsible for running four applications: APP1 405, APP2 406, APP3 407, and APP4 408.

The transactional middleware environment contains a domain, M1 DOM1 409, which includes three virtual machines, M1 411, M2 412 and M3 413. The virtual machine M1 411 is bound to the physical or logical machine, lclnx24 401, and is responsible for running application package APP1 405. Similarly, the virtual machine M2 402 is bound to the physical or logical machine, lclnx16 402, and is responsible for running application package APP2 406.

As shown in FIG. 4, the virtual machine 3 403 is not yet bound to any physical machines in the transactional middleware environment. Under the virtual machine M3 403, there's a machine candidate directory, Candidate Machine 410, which can be used by the users to add one or more logical or physical candidate machines, lclnx10 403 and lclnx11 404. The candidate machines, lclnx10 403 and lclnx11 404, can have similar architecture as the other activated machines, lclnx24 401 and lclnx16 402, so that the application packages, APP1 405, APP2 406, APP3 407, and APP4 408 can be executed on either machine, lclnx10 403 and lclnx11 404, without difficulty.

For example, the dynamic resource broker allows a candidate machine, e.g. lclnx10 403, to be bound with the virtual machine M3 403, when the virtual machine M2 412 is overloaded. Furthermore, if the candidate machine is un-bound from the virtual machine, other candidate machines, e.g. lclnx11 404, can have the opportunity to be bound with the virtual machine M3 403.

As shown in FIG. 1, a dynamically deployed candidate machine may not become the master node in a domain, since the master node, Machine A 101, in Domain A 108 maintains consistent connection with the deployment center 106. Thus, in the example as shown in FIG. 4, the candidate machines, lclnx10 403 and lclnx11 404, may not become the master node in the domain, DOM1 409.

In accordance with an embodiment of the invention, a transactional system can be dynamically scaled up/down both at the machine level and at the package level. Users can list one or more application packages, APP3 407 and APP4 408, in a package candidate directory, Candidate Package 415, so that the application packages APP3 407 and APP4 408 can be deployed to a candidate machine when the machine is dynamically deployed.

The dynamic resource broker allows a user to perform the machine level dynamic deployment both manually and automatically. The dynamic resource allocation/deallocation helps customer to manage the resources more flexible in cloud environment. When the resource usage changes, for example, when a compute node fails or arrives at the full load, the system can provide the high availability and scalability by dynamically providing additional services from other nodes. Such a switch can be automatic and without any manual intervention.

A manual way to perform the machine level dynamic deployment allows users to activate a candidate machine when one or more users determined conditions are satisfied. Then, the user can activate one or more application packages under the package candidate directory.

For example, the user can choose to activate the candidate machine lclnx10 403 and candidate application package APP3 407 when user determined conditions are satisfied, e.g. when the virtual machine M2 412 is overloaded. Then, the system can perform a series of management operations, such as Tuxedo MIB operation, to activate the candidate machine lclnx10 403 and deploy the candidate application package APP3 407 to the machine lclnx10 403, and boot the servers contained in the machine lclnx10 403. Additionally, the users can choose to undeploy the machine lclnx10 403, at which time the system can shut down this machine and deactivate all the application packages on the machine.

On the other hand, an automatic way to perform the package level dynamic deployment allows the system to perform the MIB operations described above, with the user determined conditions pre-defined. Also, the system can perform the undeployment operations automatically.

Additionally, in the example of Tuxedo, the same parameter replacement rules can be used to perform the above MIB operations in both the manual deployment and the automatic deployment. The dynamic resource broker can reuse existing mechanisms, e.g. file formats, for deploying application packages to perform the dynamic scaling up/down resources in a transactional domain.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting a dynamic scaling of applications in a transactional middleware machine environment, comprising:
a plurality of physical machines comprising a plurality of transactional middleware machines in a transactional domain of the transactional middleware machine environment;
a plurality of deployment agents, each of which is associated with a transactional middleware machine of said plurality of transactional middleware machines;
a plurality of virtual machines wherein each of said plurality of virtual machines may be bound to one of said plurality of physical machines in order to operate said virtual machine;
a plurality of different application packages embodying a plurality of different applications executable by one or more of said plurality of virtual machines;
a deployment center running on one or more microprocessors in the transactional middleware machine environment; wherein the deployment center receives machine usage information from the plurality of deployment agents;
wherein each of said plurality of virtual machines comprises a plurality of candidate different application packages which may be activated or deactivated on said virtual machine by said deployment center in response to said machine usage information received from the plurality of deployment agents, and wherein the deployment center is configured to automatically scale up execution of a particular application of said plurality of different applications in the transactional domain, in response to said machine usage information collected by the plurality of deployment agents, using two different mechanisms including,
dynamically deploying an associated particular one of said plurality of different application packages to an operating virtual machine of said plurality of virtual machines and activating said particular application on said operating virtual machine; and
binding, to a physical machine of said plurality of physical machines, a non-operating one of said plurality of virtual machines to which said associated one of said plurality of different application packages had previously been deployed, booting said non-operating one of said plurality of virtual machines and activating said particular application; and
wherein the dynamic resource broker is configured to automatically scale down execution of said particular application, in response to said machine usage information collected by the one or more deployment agents, using two different mechanisms including,
dynamically undeploying said associated particular one of said plurality of different application packages from an operating virtual machine of said plurality of virtual machines such that said operating virtual machine terminates executing said particular application; and
unbinding, from a physical machine of said plurality of physical machines, an operating one of said plurality of virtual machines on which said associated one of said plurality of different application packages had previously been deployed, such that said operating one of said plurality of virtual machines terminates operating and terminates executing said particular application.

2. The system of claim 1, wherein the deployment center maintains one or more deployment policies for the transactional middleware machine environment.

3. The system of claim 1, wherein each said deployment agent operates to collect resource usage metrics of a particular machine that said deployment agent resides on, and report the collected resource usage metrics to the deployment center.

4. The system of claim 1, wherein the deployment center is responsible for managing multiple transactional domains.

5. The system of claim 4, wherein the deployment center operates to dynamically scale up or down resources used in another transactional domain based on the resource usage information collected by another plurality of deployment agents.

6. The system of claim 4, wherein there is a master machine within each transactional domain, and wherein a configuration of the master machine within each transactional domain remains unchanged.

7. The system of claim 1, further comprising a data repository that stores one or more application components uploaded by a user, before the one or more application components are deployed to the plurality of transactional middleware machines in the transactional middleware machine environment.

8. The system of claim 1, wherein at least one transactional middleware machine in the transactional middleware machine environment is a virtual machine, which can be bonded to a physical machine in a machine list.

9. The system of claim 1, wherein:
  each of said plurality of virtual machines identifies a plurality of candidate physical machines to which said virtual machine many be bonded by said deployment center in response to said machine usage information collected by the one or more deployment agents.

10. A method for supporting dynamic scaling of applications on a plurality of physical machines comprising a plurality of transactional middleware machines in a transactional domain in a transactional middleware machine environment, the method comprising:
  providing a plurality of deployment agents, each of which is associated with a transactional middleware machine of said plurality of transactional middleware machines;
  generating machine usuage information with said plurality of deployment agents;
  providing a plurality of virtual machines wherein each of said plurality of virtual machines may be bound to one of said plurality of physical machines in order to operate said virtual machine;
  providing a plurality of different application packages embodying a plurality of different applications executable by one or more of said plurality of virtual machines;
  providing a deployment center running on one or more microprocessors in the transactional middleware machine environment;
  receiving, with the deployment center, said machine usage information from said plurality of deployment agents;
  wherein each of said plurality of virtual machines comprises a plurality of candidate different application packages which may be activated or deactivated on said virtual machine by said deployment center in response to said machine usage information received from the plurality of deployment agents, and wherein the deployment center automatically scales up execution of a particular application of said plurality of different applications in the transactional domain, in response to said machine usage information collected by the plurality of deployment agents, by,
  dynamically deploying an associated particular one of said plurality of different application packages to an operating virtual machine of said plurality of virtual machines and activating said particular application on said operating virtual machine; and also by
  binding, to a physical machine of said plurality of physical machines, a non-operating one of said plurality of virtual machines to which said associated one of said plurality of different application packages had previously been deployed, booting said non-operating one of said plurality of virtual machines and activating said particular application; and
  wherein the dynamic resource broker automatically scales down execution of said particular application, in response to said machine usage information collected by the one or more deployment agents, by
  dynamically undeploying said associated particular one of said plurality of different application packages from an operating virtual machine of said plurality of virtual machines such that said operating virtual machine terminates executing said particular application; and also by
  unbinding, from a physical machine of said plurality of physical machines, an operating one of said plurality of virtual machines on which said associated one of said plurality of different application packages had previously been deployed, such that said operating one of said plurality of virtual machines terminates operating and terminates executing said particular application.

11. The method of claim 10, further comprising allowing the deployment center to maintain one or more deployment policies for the transactional middleware machine environment.

12. The method of claim 10, further comprising allowing each said deployment agent to collect resource usage metrics of a particular machine that said deployment agent resides on, and report the collected resource usage metrics to the deployment center.

13. The method of claim 10, further comprising allowing the deployment center to be responsible for managing multiple transactional domains.

14. The method of claim 13, further wherein the deployment center operates to dynamically scale up or down resources used in another transactional domain based on the resource usage information collected by another plurality of deployment agents.

15. The method of claim 13, further comprising assigning a master machine within each transactional domain, and allowing a configuration of the master machine within each transactional domain to remain unchanged.

16. The method of claim 10, further comprising providing a data repository that stores said plurality of different application packages before deployment to the plurality of transactional middleware machines in the transactional middleware machine environment.

17. The method of claim 10, wherein each of said plurality of virtual machines identifies a plurality of candidate physical machines to which said virtual machine many be bonded by said deployment center in response to said machine usage information collected by the plurality of deployment agents.

18. A non-transitory computer readable storage medium including instructions stored thereon for supporting dynamic scaling of applications on a plurality of physical machines comprising a plurality of transactional middleware machines in a transactional domain in a transactional middleware machine environment, said instructions, when executed by a computer, causing the computer to perform steps comprising:

provided a plurality of deployment agents, each of which is associated with a transactional middleware machine of said plurality of transactional middleware machines;

generating machine usuage information with said plurality of deployment agents;

providing a plurality of virtual machines wherein each of said plurality of virtual machines may be bound to one of said plurality of physical machines in order to operate said virtual machine;

providing a plurality of different application packages embodying a plurality of different applications executable by one or more of said plurality of virtual machines;

providing a deployment center running on one or more microprocessors in the transactional middleware machine environment;

receiving, with the deployment center, said machine usage information from said plurality of deployment agents;

wherein each of said plurality of virtual machines comprises a plurality of candidate different application packages which may be activated or deactivated on said virtual machine by said deployment center in response to said machine usage information received from the plurality of deployment agents, and wherein the deployment center automatically scales up execution of a particular application of said plurality of different applications in the transactional domain, in response to said machine usage information collected by the plurality of deployment agents, by, dynamically deploying an associated particular one of said plurality of different application packages to an operating virtual machine of said plurality of virtual machines and activating said particular application on said operating virtual machine; and also by binding, to a physical machine of said plurality of physical machines, a non-operating one of said plurality of virtual machines to which said associated one of said plurality of different application packages had previously been deployed, booting said non-operating one of said plurality of virtual machines and activating said particular application; and wherein the dynamic resource broker automatically scales down execution of said particular application, in response to said machine usage information collected by the one or more deployment agents, by dynamically undeploying said associated particular one of said plurality of different application packages from an operating virtual machine of said plurality of virtual machines such that said operating virtual machine terminates executing said particular application; and also by unbinding, from a physical machine of said plurality of physical machines, an operating one of said plurality of virtual machines on which said associated one of said plurality of different application packages had previously been deployed, such that said operating one of said plurality of virtual machines terminates operating and terminates executing said particular application.

* * * * *

UNITED STATES PATENT AND TRADEMARK OFFICE
CERTIFICATE OF CORRECTION

PATENT NO.       : 8,825,864 B2  
APPLICATION NO.  : 13/423024  
DATED            : September 2, 2014  
INVENTOR(S)      : Li et al.

Page 1 of 1

It is certified that error appears in the above-identified patent and that said Letters Patent is hereby corrected as shown below:

On the Title Page

Column 2, item (74), under Primary Examiner, line 1, delete "Farid Homayoumehr" and insert -- Farid Homayounmehr --, therefor.

Column 2, item (57), under Abstract, line 4, after "be" delete "by".

In the Specification

In column 4, line 32, delete "seperately" and insert -- separately --, therefor.

In column 6, line 27, after "domain," delete "M1".

In column 6, line 34, delete "3" and insert -- M3 --, therefor.

In the Claims

In column 9, line 34, in Claim 9, delete "many" and insert -- may --, therefor.

In column 9, line 45, in Claim 10, delete "usuage" and insert -- usage --, therefor.

In column 10, line 60, in Claim 17, delete "many" and insert -- may --, therefor.

In column 11, line 6, in Claim 18, delete "usuage" and insert -- usage --, therefor.

Signed and Sealed this  
Twenty-fourth Day of March, 2015

Michelle K. Lee  
*Director of the United States Patent and Trademark Office*